United States Patent
Chen

(10) Patent No.: US 7,330,343 B2
(45) Date of Patent: Feb. 12, 2008

(54) CURRENT-LIMITING PROTECTION CIRCUIT FOR A POWER SUPPLY

(75) Inventor: Michael Chen, Taipei Hsien (TW)

(73) Assignee: Topower Computer Industrial Co., Ltd., Xindian (TW)

(*) Notice: Subject to any disclaimer, the term of this patent is extended or adjusted under 35 U.S.C. 154(b) by 145 days.

(21) Appl. No.: 11/181,831

(22) Filed: Jul. 15, 2005

(65) Prior Publication Data

US 2006/0176634 A1   Aug. 10, 2006

Related U.S. Application Data

(63) Continuation-in-part of application No. 11/049,745, filed on Feb. 4, 2005, now Pat. No. 7,259,950.

(51) Int. Cl.
H02H 3/08 (2006.01)
H02H 9/02 (2006.01)

(52) U.S. Cl. .................. 361/93.1; 90/94; 90/98

(58) Field of Classification Search ............... 361/93.1, 361/94, 98
See application file for complete search history.

(56) References Cited

U.S. PATENT DOCUMENTS

| | | | | |
|---|---|---|---|---|
| 4,414,598 A | * | 11/1983 | Nowell | 361/18 |
| 4,439,806 A | * | 3/1984 | Brajder | 361/98 |
| 5,406,130 A | * | 4/1995 | Hennig | 327/108 |
| 5,493,214 A | * | 2/1996 | Good et al. | 324/173 |
| 5,801,503 A | * | 9/1998 | Kim et al. | 318/434 |
| 6,476,729 B1 | * | 11/2002 | Liu | 340/870.11 |
| 6,650,245 B2 | * | 11/2003 | Chung | 340/648 |
| 7,031,128 B2 | * | 4/2006 | Nam | 361/90 |

* cited by examiner

*Primary Examiner*—Michael Sherry
*Assistant Examiner*—Zeev Kitov
(74) *Attorney, Agent, or Firm*—Birch, Stewart, Kolasch & Birch, LLP

(57) ABSTRACT

The present invention discloses a current-limiting protection circuit for a power supply, which applies to a power supply that has a maximum power-limiting function, wherein the user will be alarmed by a time-delay alarm circuit of the current-limiting protection circuit when the power used by the loads is in a heavy-load state or a full-load state, and within the delay time preset in the time-delay alarm circuit, the user can adjust the power-limiting value according to the power needed by the loads. Thus, via the current-limiting protection circuit for the power supply of the present invention, the objective of the best power selection and protection of the power supply is achieved.

7 Claims, 3 Drawing Sheets

US 7,330,343 B2

CURRENT-LIMITING PROTECTION CIRCUIT FOR A POWER SUPPLY

This application is a continuation-in-part, and claims priority, of from U.S. patent application Ser. No. 11/049,745 filed on Feb. 4, 2005 now U.S. Pat. No. 7,259,950, entitled "Load-protection control circuit of power supply".

FIELD OF THE INVENTION

The present invention relates to a current-limiting protection circuit for a power supply, particularly to one, which applies to a power supply that has a maximum power-limiting function.

BACKGROUND OF THE INVENTION

As the user demands higher and higher operating speed of the computer, the power required by the central processing unit and the peripheral devices grows correspondingly, and thus, the power supply used in the computer system needs to provide a higher power output; however, considering the harm that the electricity can do on the human body, the power supply has an energy-limiting standard for its output power, i.e. maximum output power (Max VA), which is usually 240VA in the current specification; thus, if the output voltage is 12V, the maximum output current will be 20 A. For example, in SSI or UL, the electric device has an energy-hazard standard stipulating that maximum output power of a power supply is 240 VA in order to protect the computer user's safety.

With the fast-increasing operating speed of the computer system and more and more peripheral devices connected thereto, if persisting in high-level safety standard, one have to pay for the expense of additional power output ports. Each power output port needs a power-protection circuit, and the manufacturer has to fabricate various specifications of power supplies with different power-protection circuits demanded by different systems, which besets the manufacturer very much, needless to mention the difficulty of the design of the power-protection circuit. Furthermore, many high-level peripheral devices require a power higher than that regulated by a protection standard, and the user has to adopt the power supply without protection function; thus, to meet the market demand, the power supply's manufacturer has to provide the power supply with high power output but without protection function, which further raises the cost of design and fabrication and lacks economical profit.

SUMMARY OF THE INVENTION

The primary objective of the present invention is to provide a current-limiting protection circuit for a power supply, wherein the user will be alarmed when the power used by the loads is in a heavy-load state or a full-load state, and within the delay time provided by the present invention, the user can adjust the power-limiting value according to the power needed by the loads in order to achieve the best power selection and protection of a power supply.

DETAILED DESCRIPTION OF THE PREFERRED EMBODIMENTS

The detailed description and the technical contents of the present invention are to be stated below in cooperation with the attached drawings.

Figure 1:
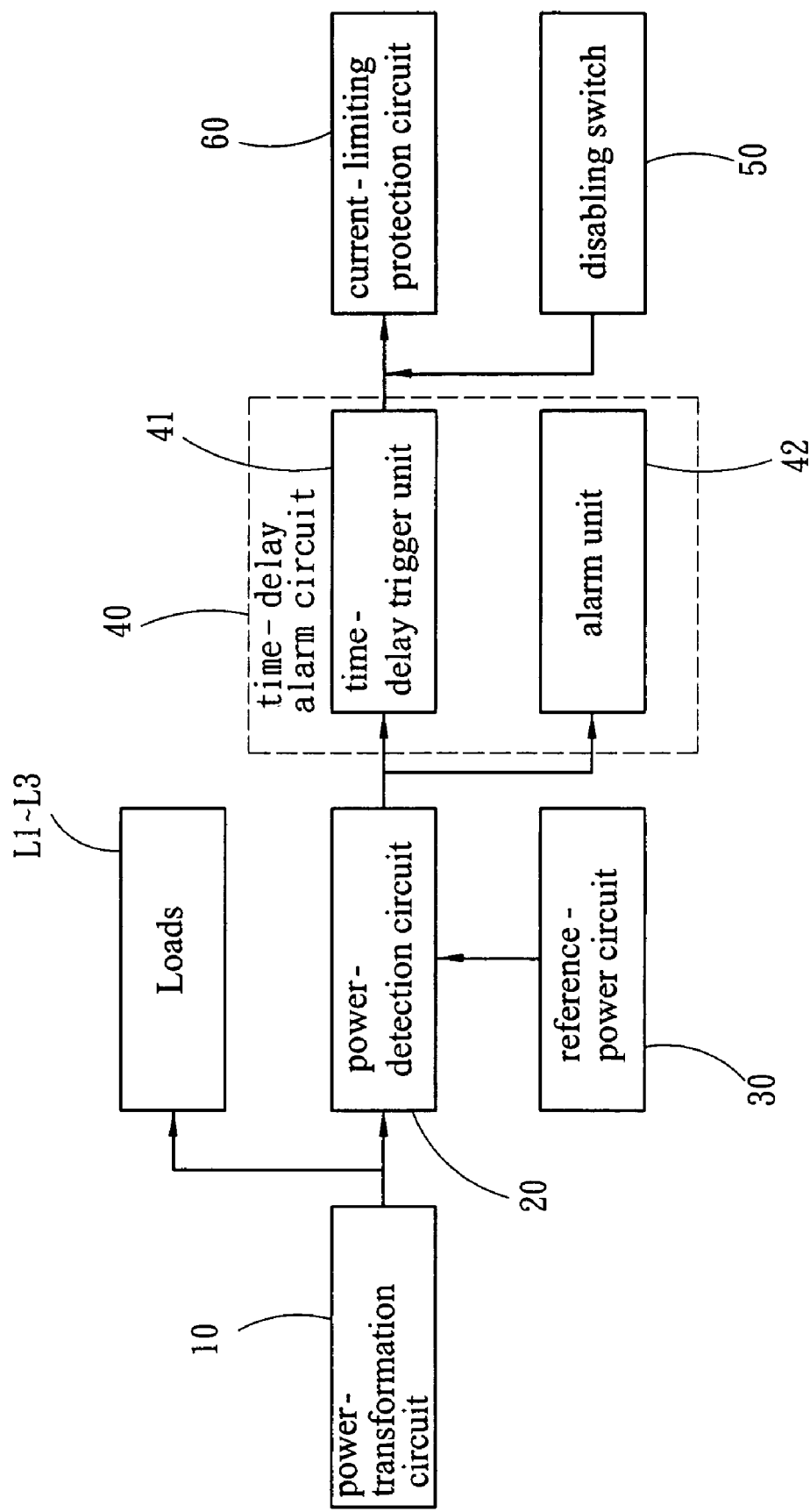
FIG. 1 is a schematic block diagram of the circuit according to the present invention.
Figure 2:
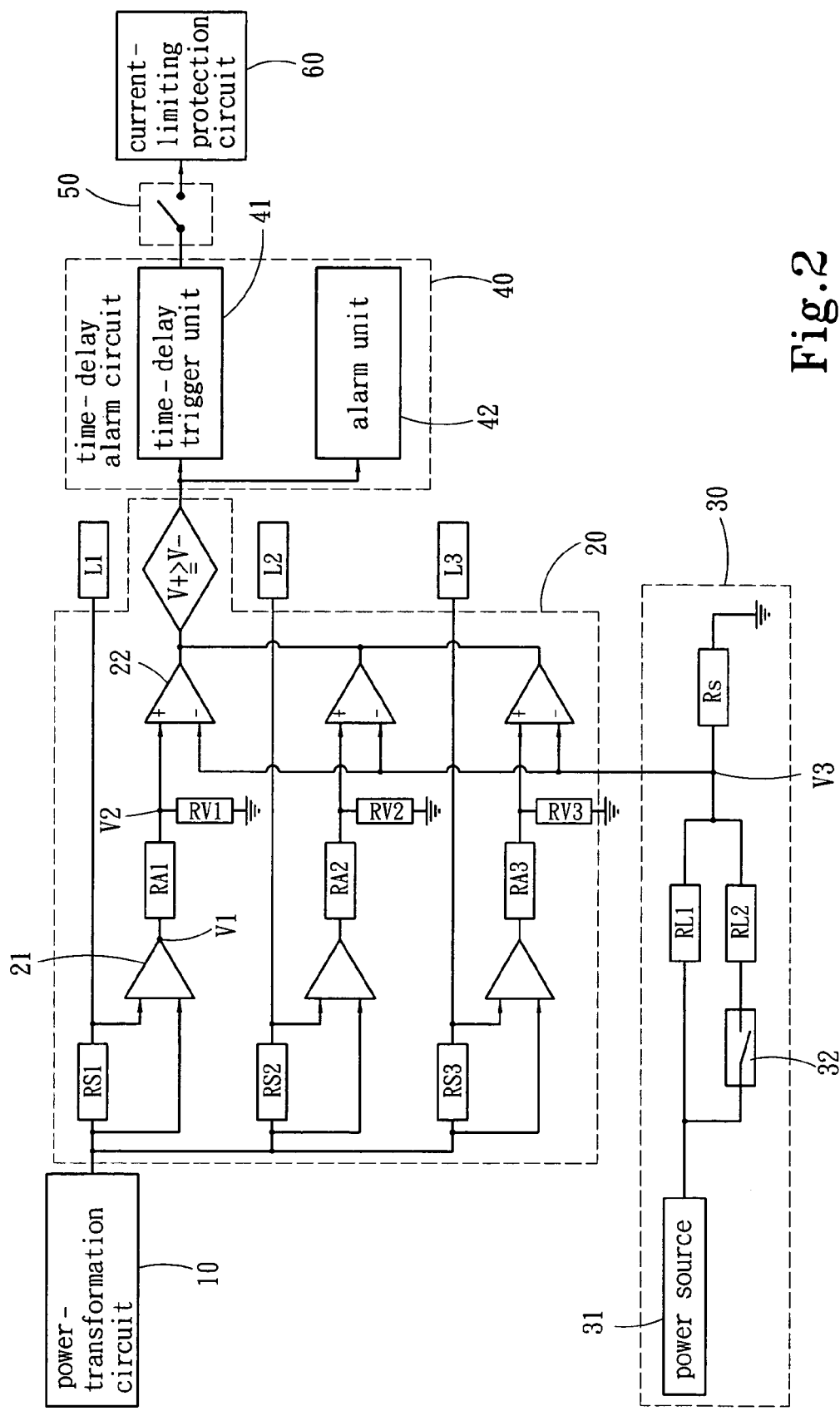
FIG. 2 is a schematic diagram of the circuit according to one embodiment of the present invention.
Figure 3:
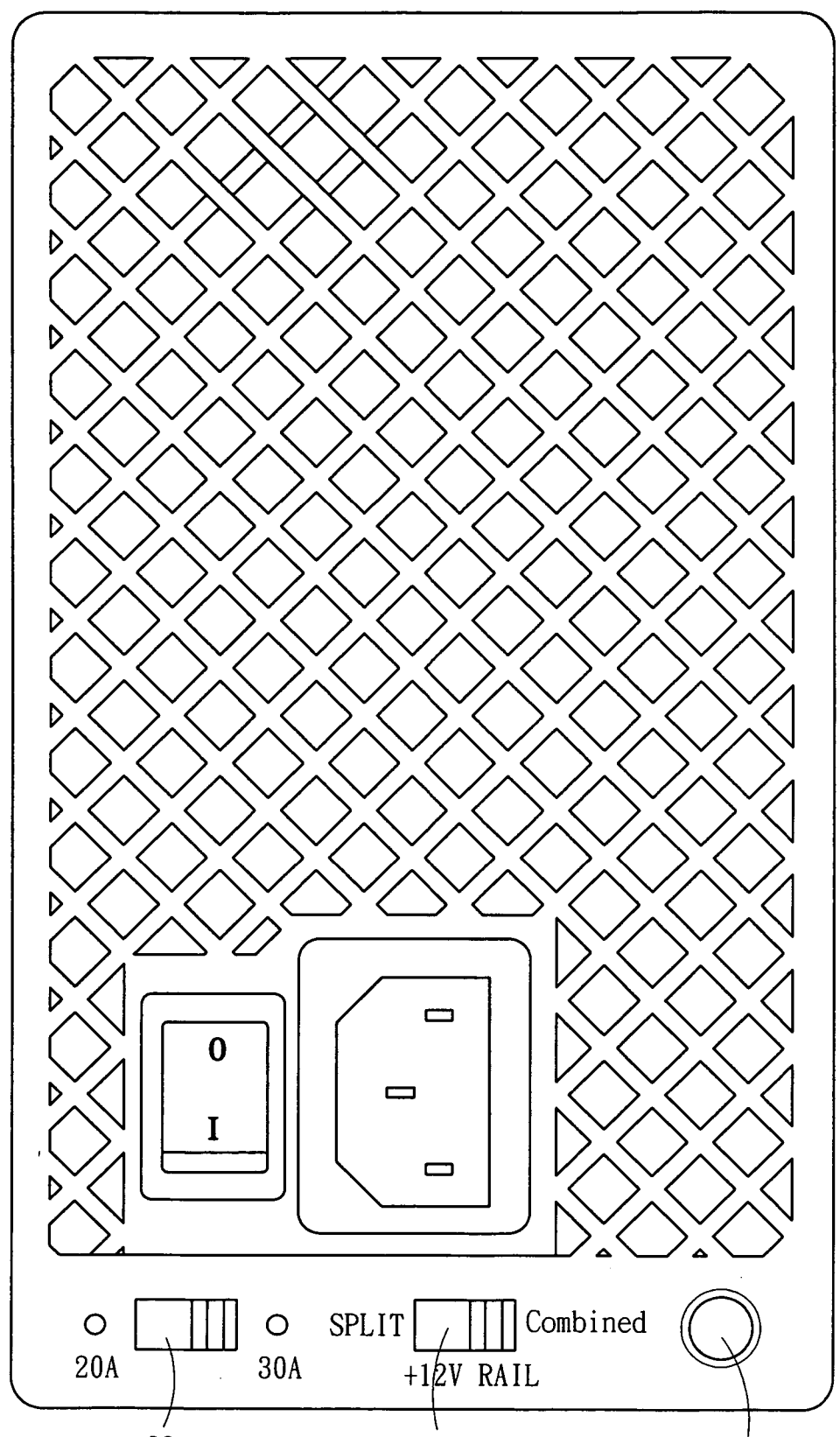
FIG. 3 is a schematic diagram of the power supply panel according to the present invention.

Refer to FIG. 1, FIG. 2, and FIG. 3. The present invention applies to a power supply, which comprises at least: a power-transformation circuit 10, which outputs direct-current power to drive at least one load L1~L3; and a current-limiting protection circuit 60, which is electrically coupled to the power-transformation circuit 10 and determines the power-usage status of the loads L1~L3. The current-limiting protection circuit 60 comprises:

a power-detection circuit 20, electrically coupled to the power-transformation circuit 10 and the loads L1~L3, and acquiring a usage-power value V2 from the direct-current power of the loads L1~L3, wherein the working-power value V2 is compared with a preset power-limiting value V3 in order to output a protection signal;

a time-delay alarm circuit 40, electrically coupled to the power-detection circuit 20 and receiving the protection signal, wherein the time-delay alarm circuit 40 further comprises: a time-delay trigger unit 41 and an alarm unit 42, and wherein once the time-delay trigger unit 41 receives the protection signal, the time-delay trigger unit 41, which may be a timer, begins to set a delay time, and once the delay time expires, a triggering signal will be sent out, and the alarm unit 42, which may be an LED alarm light or a buzzer, will output an alarm signal to indicate a heavy-load state or a full-load state of the loads L1~L3;

a reference-power circuit 30, electrically coupled to the power-detection circuit 20, and providing the power-limiting value V3 for the power-detection circuit 20.

An embodiment is to be used to exemplify the present invention. In this embodiment, the power-detection circuit 20 further comprises a signal amplifier 21 and a power comparator 22; there is a resistance RS1~RS3 connected to the load L1~L3 and the power-transformation circuit 10 in series; a potential difference will be obtained from both ends of the resistance RS1~RS3 and amplified by the amplifier 21 in order to obtain a detected voltage V1; the detected voltage V1 is divided by a power resistance and a voltage divided resistance RV1~RV3 to create a usage-power value V2, which is input to one receiving end of the power comparator 22; the other receiving end of the power comparator 22 is coupled to the reference-power circuit 30 to obtain the power-limiting value V3. The reference-power circuit 30 further comprises: a power source 31, providing power for the reference-power circuit 30; multiple reference elements RL1, RL2, coupled to the power source 31, and creating multiple power-limiting values V3; and a switch 32, coupled to the reference elements RL1, RL2, and determining the power-limiting value V3, which is to be input to the power-detection circuit 20. When the power used by the loads L1~L3 reaches the heavy-load state or the full-load state determined by the preset power-limiting value V3, the power comparator 22 will output a protection signal to trigger the time-delay alarm circuit 40; at this moment, the user will be informed that the loads L1~L3 reach the heavy-load state or the full-load state via an alarm signal generated by the alarm unit 42. Then, according to the power-usage status of the loads L1~L3, the user will determine whether to utilize the switch 32 to shift the power-limiting value V3 (e.g. switched from 20A to 30 A) or to utilize a disabling switch 50, which is installed between the time-delay trigger unit 41 and the current-limiting protection circuit 60, to cancel the current-limiting protection. If the user undertakes the abovementioned shifting the power-limiting value V3, the time-delay trigger unit 41 will stop clocking owing to the interrupt of the protection signal. If the user does not undertake the abovementioned shifting the power-limiting value V3 timely, and when the delay time expires, the time-delay trigger unit 41 will send out a triggering signal to the current-limiting protection circuit 60 to shut or pause the direct-current power output of the power-transformation circuit 10 in order to protect the user and the loads L1~L3.

Those described above are only the preferred embodiments of the present invention but not intended to limit the scope of the present invention. Any equivalent modification and variation according to the spirit of the present invention is to be included within the scope of the present invention.

What is claimed is:

1. A current-limiting protection circuit for a power supply, which applies to a power supply that comprises at least: a power-transformation circuit, which outputs direct-current power to drive at least one load; and a current-limiting protection circuit, which is electrically coupled to said power-transformation circuit and determines the power-usage status of said load, wherein said current-limiting protection circuit comprises:
    a power-detection circuit, electrically coupled to said power-transformation circuit and said load, and acquiring a usage-power value from the direct-current power of said load, wherein said usage-power value is compared with a preset power-limiting value in order to output a protection signal;
    a time-delay alarm circuit, electrically coupled to said power-detection circuit and receiving said protection signal, wherein said time-delay alarm circuit further comprises: a time-delay trigger unit and an alarm unit, and wherein once said time-delay trigger unit receives said protection signal said alarm unit outputs an alarm signal to indicate heavy-load state and a full-load state of said load, and said time-delay trigger unit begins to set a delay time, and once said delay time expires, a triggering signal will be sent to said current-limiting protection circuit to shut or pause the direct-current power output of said power-transformation circuit;
    a disabling switch connected between said time-delay trigger unit and said current-limiting protection circuit, said disabling switch being selectively opened to prevent said triggering signal from reaching said current-limiting protection circuit;
    a reference-power circuit, electrically coupled to said power-detection circuit, and providing said power-limiting value for said power-detection circuit.

2. The current-limiting protection circuit for a power supply according to claim 1, wherein said time-delay trigger unit is a timer.

3. The current-limiting protection circuit for a power supply according to claim 1, wherein said alarm unit is an LED alarm light.

4. The current-limiting protection circuit for a power supply according to claim 1, wherein said alarm unit is a buzzer.

5. The current-limiting protection circuit for a power supply according to claim 3, wherein said power-detection circuit further comprises a signal amplifier and a power comparator; there is a resistance connected to said load and said power-transformation circuit in series; a potential difference is obtained from both ends of said series-connection resistance and amplified by said amplifier in order to obtain a detected voltage; said detected voltage is divided by a power resistance and a voltage divided resistance to create a usage-power value, which is input to one receiving end of said power comparator; and the other receiving end of said power comparator is coupled to said reference-power circuit to obtain said power-limiting value.

6. The current-limiting protection circuit for a power supply according to claim 1, wherein said reference-power circuit further comprises: a power source, providing power for said reference-power circuit; multiple reference elements, coupled to said power source, and creating multiple power-limiting values; and a switch, coupled to said reference elements, and determining one said power-limiting value, which is to be input to said power-detection circuit.

7. The current-limiting protection circuit for a power supply according to claim 6, wherein said switch is selectively enabled to provide a different one of said multiple power-limiting values after said alarm unit outputs said alarm signal, to prevent said triggering signal from being sent out.

* * * * *